United States Patent [19]

Lerner

[11] Patent Number: 4,541,698

[45] Date of Patent: Sep. 17, 1985

[54] REMOTE CAMERA VIEWFINDER

[75] Inventor: Richard Lerner, Englewood, Colo.

[73] Assignee: Cine-Tech, Inc., Englewood, Colo.

[21] Appl. No.: 505,733

[22] Filed: Jun. 20, 1983

[51] Int. Cl.[4] .................. G03B 29/00; G03B 13/02
[52] U.S. Cl. .................................. 354/82; 354/219; 354/223
[58] Field of Search .................. 354/62, 63, 79, 81, 354/82, 219, 223, 224, 225

[56] References Cited

U.S. PATENT DOCUMENTS 4,017,168  4/1977  Brown ................................. 354/82

OTHER PUBLICATIONS

Olympus Industrial Fiberscope Model IF Brochure, No. F59E-0582B, published May 1982, p. 2.

Primary Examiner—Russell E. Adams
Attorney, Agent, or Firm—Stanley A. Becker; James W. McClain

[57] ABSTRACT

A remote camera viewfinder has a fiber optic bundle with a fitting at one end adapted to attach to the eyepiece of a camera and a fitting at the other end for allowing a photographer to see through the fiber optic bundle. The camera end fitting has a lens for focusing the image onto the focal plane of the fiber optic bundle. The other fitting includes a lens adjacent to the end of the fiber optic bundle to magnify the image transmitted through the bundle and also includes an eyecup mounted to a helmet or headgear arrangement which holds the eyecup adjacent to the photographer's eye allowing both hands free for manipulation of the camera.

6 Claims, 2 Drawing Figures

REMOTE CAMERA VIEWFINDER

TECHNICAL FIELD

The present invention relates to a remote camera viewfinder and particularly to a remote camera viewfinder utilizing a flexible fiber optic bundle to transmit images from a camera viewfinder to an eyepiece positioned adjacent to a photographer's eye.

BACKGROUND ART

Modern photographers and particularly cinematographers are constantly looking for unique ways in which to shoot a subject or an event. In many instances when the event being shot involves some danger, the photographer does not want to be in direct line with the camera. Some prior art cameras of the type shown in U.S. Pat. No. 3,913,116 have an adjustable viewfinder allowing a photographer to use either his right or his left eye for viewing. Solid extension tubes which attach to the viewfinder of a camera are also well known. However, the photographer could be seriously hurt if the camera is bumped or hit while viewing through such a tube.

Fiber optic bundles have been used to transmit visual information from a CRT to a pilot's eyes as described in U.S. Pat. No. 3,748,016.

Additionally, fire fighting apparatus as described in U.S. Pat. No. 3,744,874 has utilized goggles which are optically connected to a laser device which is pulsed at very high frequency to decrease the effect of back-scatter from smoke particles thus allowing a firefighter to see through smoke. Fiber optic bundles have also been used in a dental mask as shown in U.S. Pat. No. 4,032,970 wherein the mask includes a fiber optic bundle which has one end positioned adjacent to a CRT to transmit a video signal to the eyes of the patient and includes a microphone for transmitting an audio signal to the ears of the patient.

There have been no devices developed to enable a photographer to see through a viewfinder from a remote location while allowing the photographer to directly operate the camera and afford safety against accidental movement of the camera toward the photographer.

DISCLOSURE OF INVENTION

The invention includes a fiber optic bundle having a fitting on one end adapted for attachment to the eyepiece of a camera and a fitting on the other end for viewing through the fiber bundle. The second fitting is attached to a headgear or other facilities which positions it adjacent to one eye of the photographer. The photographer can see through the fitting into the viewfinder of the camera to view what the camera sees from a position remote from the viewfinder. The headgear arrangement is adjustable to allow the photographer to select which eye he wants to view through and to allow the fitting to be positioned close to the eye. The photographer has both hands free for operation of the camera.

MODES FOR CARRYING OUT THE INVENTION

Figure 1:
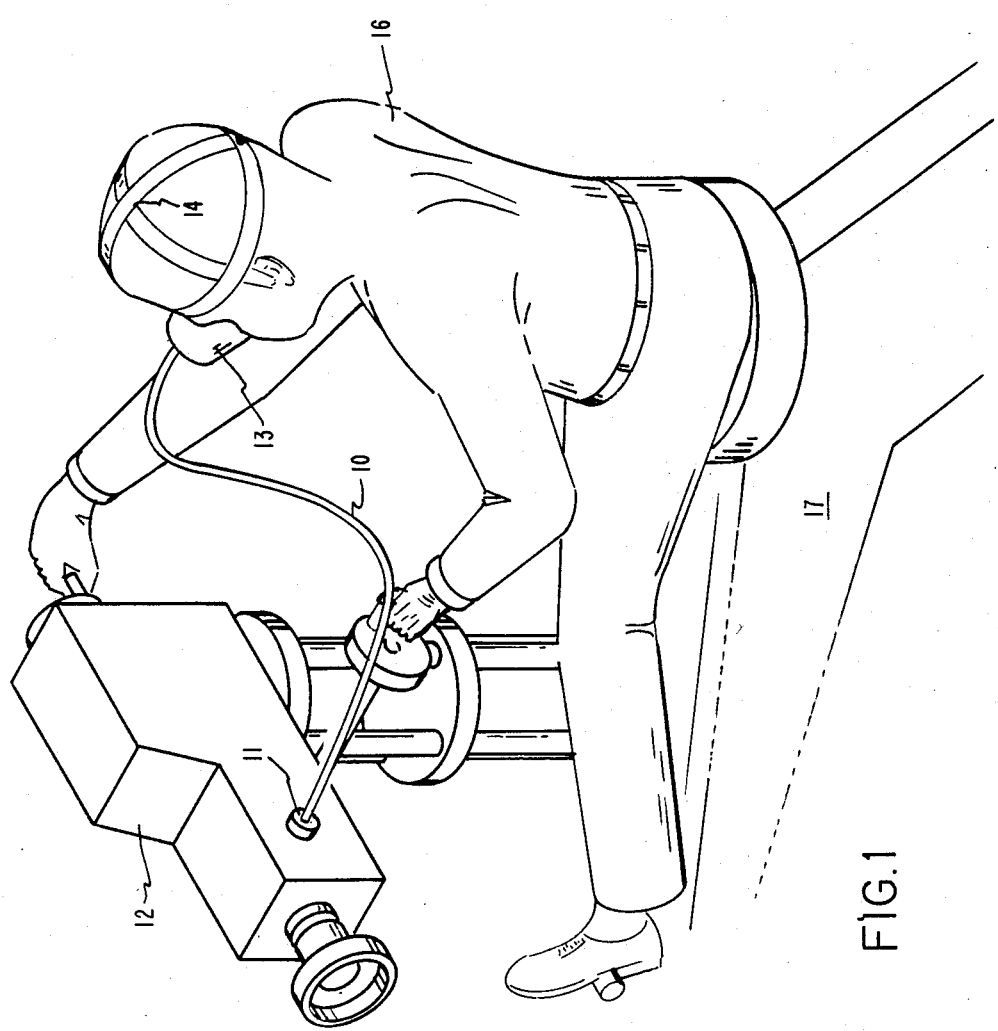
FIG. 1 is a perspective view illustrating the remote camera view finder as used by a motion picture photographer sitting on a boom.

As shown in FIG. 1, the remote camera view finder includes a fiber optic bundle 10 having a fitting 11 on one end thereof which is connected to the view finder of a camera 12. The fitting 11 is adapted for attachment to the viewfinder of a camera and is designed such that the threads match the threaded viewfinder fitting on each camera and so that the focal length of the camera is not changed. Typically, the length of the fiber optic bundle 10 will be within 3-6'. However, shorter or longer lengths can be utilized as desired for particular purposes. On the other end of the fiber optic bundle 10 is an eyecup assembly 13 which is connected to a headgear 14 positioned on the head of a photographer 16. The headgear 14 has an adjusting band 18 which enables each user to adjust the band to the desired fit. As shown, the photographer is seated on a boom 17 on which the camera 12 is mounted. By utilizing the remote camera viewfinder, the photographer is able to use both hands in manipulation of the camera which being able to see through the camera from a remote position. While the remote camera viewfinder is desirable for use on a boom, it is equally adaptable for use with a hand held camera wherein a photographer can for example, look through the viewfinder while holding the camera over the top of a tall building, outside of a moving car or in other situations.

While the invention is shown for use with respect to a movie camera, it also has applicability to still cameras as well. One use, for example, is for a cameramen to be able to hold the camera over the heads of a crowd to take pictures while still being able to see through the viewfinder. For such uses, a Y type fitting could be used in place of fitting 11, so at one end of the Y would go to fiber optic bundle 10 and the other end of the Y could be viewed conventionally if the photographer so desires.

Figure 2:
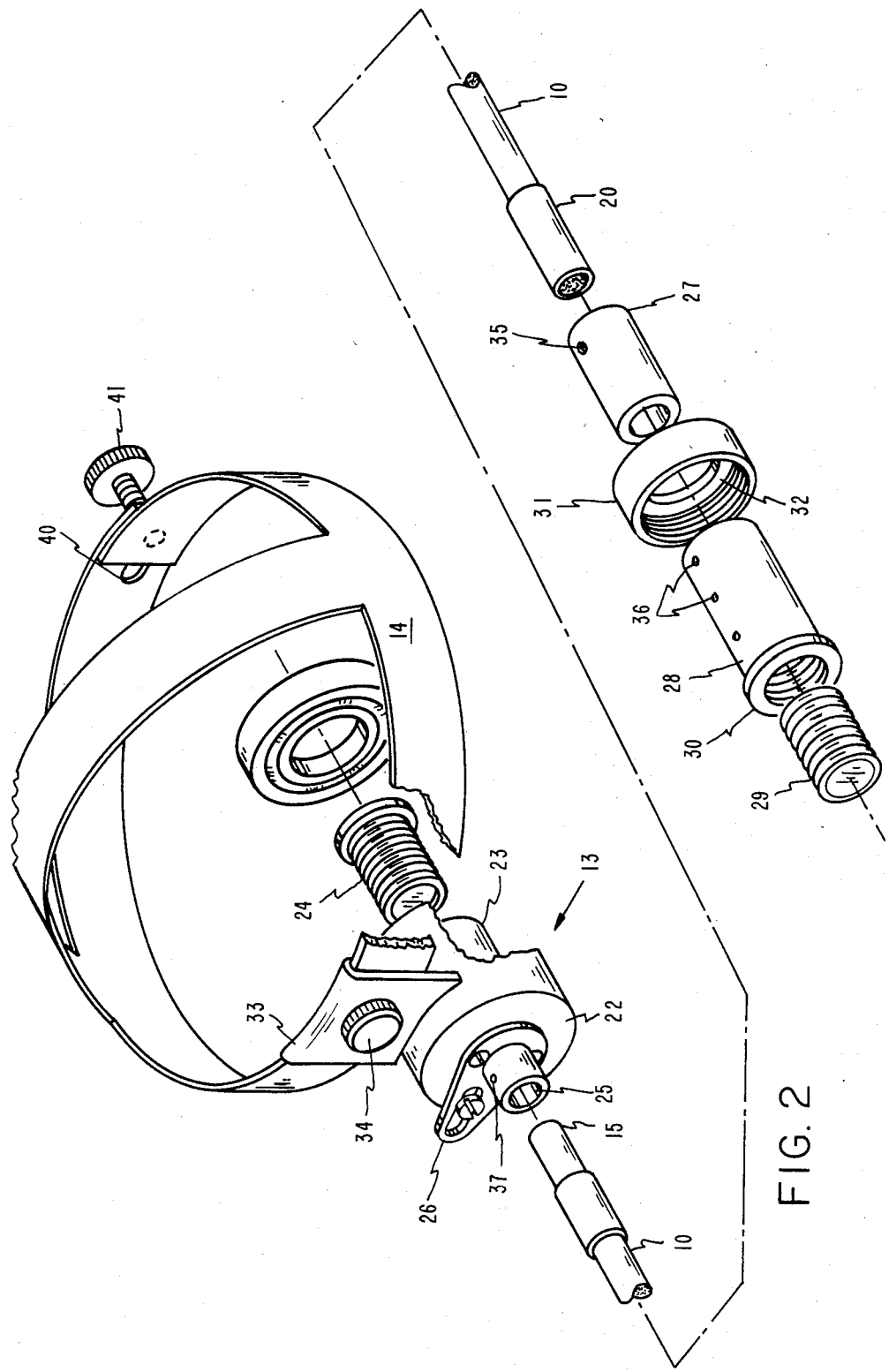
FIG. 2 is an exploded perspective view showing in more detail the remote camera view finder.

Referring to FIG. 2, there is shown an exploded view of the invention. The eyepiece assembly 13 typically has a padded foam ring 21 which is positioned about the end of eyepiece shroud 22. The eyepiece assembly 13 is connected to a mounting bracket 33 which is adjustably mounted to the headgear 14. Thumbscrew 34 or other means are provided to enable the eyecup assembly 13 to be positioned either adjacent to the left eye or the right eye. A lens holder 23 is positioned within the shroud 22 and is secured thereto by a bracket 26 and screws. An eyepiece lens 24 is threaded into the lens holder 23. The fiber optic bundle 10 typically has metal terminations 15 and 20. The termination 15 is inserted into the opening 25 of one end of the lens holder 23 and is fixed thereto by setscrew 37 or the like. A diopter adjustment (not shown) can also be placed in the eyepiece assembly 13 to adjust for individual eyesight.

At the other termination 20 of the fiber optical bundle 10 is a fiber optic adapter 27 which is connected to the fiber optic bundle by setscrew 35 or the like. The fiber optic adapter 27 is fixed within a lens holder 28 by setscrews 36. The lens holder 28 has a lens 29 threaded into one end thereof. A collar 31 fits over the other end of the lens holder 28 and has its inside surface 32 abutting against an enlarged portion 30 of the lens holder 28. The collar is designed to engage the camera eyepiece so that the lens 29 is positioned at the same focal length as the normal viewing eyepiece of the camera. Typically, the lens 29 will be selected to be as large as possible to transmit a maximum amount of light while being small enough to reduce the size and weight of the interface. Preferably the lens will have a focal length in the range of 20-25 millimeters and an aperture in the 2.8 to 3.8 F-stop range.

The fiber optic bundle preferably is a high resolution bundle for transmitting coherent light. The fiber bundle used in the preferred embodiment is American Optical IG154, which has approximately 160,000 individual coherent glass fibers, although fiber optic bundles of differing qualities may be used. The lens 29 is adjustable within the lens holder 33 to allow focal positioning of the image plane upon the surface of the end of the fiber bundle 10. Since the lens 29 reduces the image from the viewfinder, it is desirable to enlarge the image at the other end of the fiber optic bundle to facilitate viewing. It has been found that a magnification of 10-12 times is desirable. This magnification is obtained through the use of the lens 24 which may be a multiple element lens such as a Hastings Triplet. This type of lens produces a non-inverted image and allows a rather large tolerance of distance between the lens and the photographer's eye. This range of eye-to-eyepiece distance is known as eye relief.

The headgear arrangements utilized can be the hardhat or welding type headgear or any other type which are well known. The framework typically is padded and held in position with adjustable straps or bands around the head. As shown in FIG. 2, headgear 14 has a slot 40 in the headband and a thumbscrew 41 for adjustment purposes. Additionally, other facilities can be fabricated for holding the eyecup assembly 13 in position adjacent to the photographers eye, such as, for example, a shoulder mounted frame with a member extending up to the eye.

The invention allows for total flexibility in camera positioning and allows the camera to be used in positions never before possible while still permitting the photographer to have total control of composition and focus. For example, the camera can be placed into the high corner of a wall facing into a room where it is not possible to be behind the camera or bedside it to use the existing viewing system. In this instance, the operator can stand below the camera, see through the lens and continue to manipulate the camera. In another example, the camera may be held outside of a car shooting forward or back with a cameraman inside the car being able to view the exact image being photographed and to control the camera.

Safety of camera operation is of great concern to photographers and the remote camera view finder greatly increases safety in allowing the photographer to be positioned away from direct contact with the camera such as shooting from the platform of a camera car doing chase shots. In such a situation the camera may be placed outside a moving vehicle and still allow the operator to view through the remote camera viewfinder exactly what is being shot.

Whether a camera is hand held or mounted on a dolly, crane or boom, the remote viewfinder allows the operator moves that were never before possible because his head does not need to be adjacent to the existing eyepiece. Consequently, holding the camera in unusual positions, booming up and down or spinning on the axis of the boom, crane or dolly is feasible without the photographers head having to move extensively.

The subject invention also allows for improved viewing for animation optical printers, motion control or other special purpose cameras where the attached viewfinder is overhead or in any position that is not easily accessible. Since the operator is always looking through the lens, there is no need for a video camera monitor since the invention allows for perfectly accurate framing and composition.

Another use for which the remote camera viewfinder is particularly useful, is in shooting from aircraft. In such cases, certain hard or rigid type mounts are utilized to mount the camera to the aircraft. Any contact between the photographer and the camera will cause jarring to the image. When utilizing the flexible remote camera viewfinder any motion between the cameraman and the camera will not be transmitted to the camera itself because of the flexible fiber optic bundle 10.

In addition to safety for operators and flexibility of use, the use of the remote camera viewfinder also provides more comfort to photographers in that it eliminates or minimizes the need to bend or stretch for unusual shots such as low angle shots.

In underwater cameras, instead of using a sports finder which is a plastic or wire viewfinder allowing a photographer to frame a picture, the subject invention could be utilized by adjusting the eyecup assembly to abut against the photographers goggles or mask. This allows the photographer to view directly through the camera lens instead of through the sports finder.

Obviously many variations of the invention are possible within the light of the teachings presented herein, and the invention is not to be limited to the embodiment shown in the drawings and described in the description, which is given by way of example and not of limitation. It is intended, therefore, that the scope of the invention be defined in accordance with the scope of the appended claims.

What is claimed is:

1. A remote camera viewfinder comprising:
    a fiber optic bundle of determinate length;
    means for mounting one end of said bundle to the eyepiece of a camera, said mounting means including an adjustable lens for focusing the image from the camera eyepiece onto the adjacent end of the fiber optic bundle; and
    viewing means on the other end of said bundle for allowing a photographer to see through said bundle into the eyepiece of the camera from a position remote from said eyepiece.

2. A remote camera viewfinder as set forth in claim 1 where said viewing means includes an eyecup and lens for magnifying the image transmitted through said fiber optic bundle.

3. A remote camera viewfinder are set forth in claim 1 including:
    means for positioning said viewing means adjacent to one eye of the photographer to allow both hands to be free for operation of the camera.

4. A remote camera viewfinder as set forth in claim 3, wherein said positioning means is a headgear adapted to fit on the head of the photographer and includes means for adjusting the viewing means to comfortably position it adjacent to either eye of the photographer.

5. A remote camera viewfinder as set forth in claim 3, wherein said viewing means includes a lens adjacent to the end of said fiber optic bundle for magnifying the image transmitted through said fiber optic bundle.

6. A remote camera viewfinder as set forth in claim 5 wherein said viewing means further includes an eyecup adjacent to said magnifying lens.

* * * * *